(12) United States Patent
Johnson

(10) Patent No.: US 8,152,177 B1
(45) Date of Patent: Apr. 10, 2012

(54) SHOPPING CART ACCESSORY

(76) Inventor: James Raymond Johnson, Astoria, OR (US); Joan M. Johnson, legal representative, Astoria, OR (US)

(*) Notice: Subject to any disclaimer, the term of this patent is extended or adjusted under 35 U.S.C. 154(b) by 262 days.

(21) Appl. No.: 12/473,555

(22) Filed: May 28, 2009

Related U.S. Application Data

(60) Provisional application No. 61/130,568, filed on Jun. 2, 2008.

(51) Int. Cl.
*B62B 5/08* (2006.01)
*B62B 5/00* (2006.01)

(52) U.S. Cl. .............................. 280/33.993; 280/33.992

(58) Field of Classification Search ............. 280/33.993, 280/33.991, 33.992
See application file for complete search history.

(56) References Cited

U.S. PATENT DOCUMENTS

| | | | | |
|---|---|---|---|---|
| 2,257,211 | A * | 9/1941 | Willoughby | 297/461 |
| 3,170,709 | A * | 2/1965 | Shackel | 280/47.34 |
| 4,116,456 | A * | 9/1978 | Stover et al. | 280/33.993 |
| D281,365 | S * | 11/1985 | Gugler | D34/27 |
| 5,161,811 | A * | 11/1992 | Cheng | 280/30 |
| 5,213,360 | A * | 5/1993 | Lin | 280/648 |
| 5,547,205 | A * | 8/1996 | do Rosario Sousa de Cabedo | 280/30 |
| 5,695,246 | A * | 12/1997 | Tsai | 297/335 |
| 5,848,797 | A * | 12/1998 | Paez | 280/33.993 |
| 5,918,891 | A * | 7/1999 | Russell | 280/33.991 |
| 6,155,592 | A * | 12/2000 | Hsia | 280/647 |
| 6,540,239 | B2 * | 4/2003 | Lee, Jr. | 280/33.993 |
| 6,543,796 | B1 * | 4/2003 | Johnson et al. | 280/47.18 |
| D490,200 | S * | 5/2004 | Arceta | D34/17 |
| 7,819,467 | B1 * | 10/2010 | Schimmeyer | 297/14 |
| 2002/0149163 | A1 * | 10/2002 | Lee, Jr. | 280/33.993 |
| 2005/0151333 | A1 * | 7/2005 | Russell et al. | 280/33.993 |
| 2008/0100010 | A1 * | 5/2008 | Russell et al. | 280/33.993 |

* cited by examiner

*Primary Examiner* — Ruth Ilan
*Assistant Examiner* — Barry Gooden, Jr.
(74) *Attorney, Agent, or Firm* — Chernoff, Vilhauer, McClung & Stenzel

(57) ABSTRACT

A shopping cart has a forward end and an aft end and includes a base structure including wheels, a chassis supported on the wheels, and a basket attached to the chassis. The shopping cart also includes an accessory seat structure attached in articulated fashion to the base structure and including a seat base and at least one leg attached to the seat base. The seat base has a forward end and an aft end. The accessory seat structure is movable relative to the base structure between a stored position, in which the forward end of the seat base is positioned beneath the basket, and a deployed position, in which the seat base extends aft of the basket and is supported in a substantially horizontal orientation by the base structure at the forward end of the seat base and by the leg at the aft end of the seat base.

1 Claim, 2 Drawing Sheets

SHOPPING CART ACCESSORY

CROSS-REFERENCE TO RELATED APPLICATION

This application claims benefit of U.S. Provisional Application No. 61/130,565 filed Jun. 2, 2008, the entire disclosure of which is hereby incorporated herein by reference for all purposes.

BACKGROUND OF THE INVENTION

The subject matter of this application relates to a shopping cart accessory.

The conventional shopping cart, as used in supermarkets, discount warehouses and other stores, is an invaluable adjunct to the shopping experience, in that it allows the shopper to transport potential purchases around the store with relatively ease, so that the shopper's purchases are not limited by what the shopper can carry to the checkout stand.

This advantage of the shopping cart brings the disadvantage that a shopper who is elderly or frail may grow weary well before the shopping cart is full.

Some stores provide electric mobility scooters equipped with shopping baskets for elderly or physically impaired shoppers, but many shoppers are intimidated by these devices, which are quite bulky and may require that the shopper dismount from the scooter in order to make a selection and then remount in order to move on to the next item. Thus, the mobility scooter is not optimum for many shoppers.

Most stores do not provide seats for a shopper to rest while shopping, the store operators perhaps being of the view that space given over to seating cannot be used for displaying merchandise for sale. Nevertheless, it is desirable that a shopper should have the opportunity to rest while shopping.

SUMMARY OF THE INVENTION

In accordance with the subject matter of this application there is provided a shopping cart having a forward end and an aft end and comprising a base structure including wheels, a chassis supported on the wheels, and a basket attached to the chassis, the shopping cart also comprising an accessory seat structure attached in articulated fashion to the base structure and including a seat base and at least one leg attached to the seat base, wherein the seat base has a forward end and an aft end, the accessory seat structure is movable relative to the base structure between a stored position, in which the forward end of the seat base is positioned beneath the basket, and a deployed position, in which the seat base extends aft of the basket and is supported in a substantially horizontal orientation by the base structure at the forward end of the seat base and by the leg at the aft end of the seat base.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
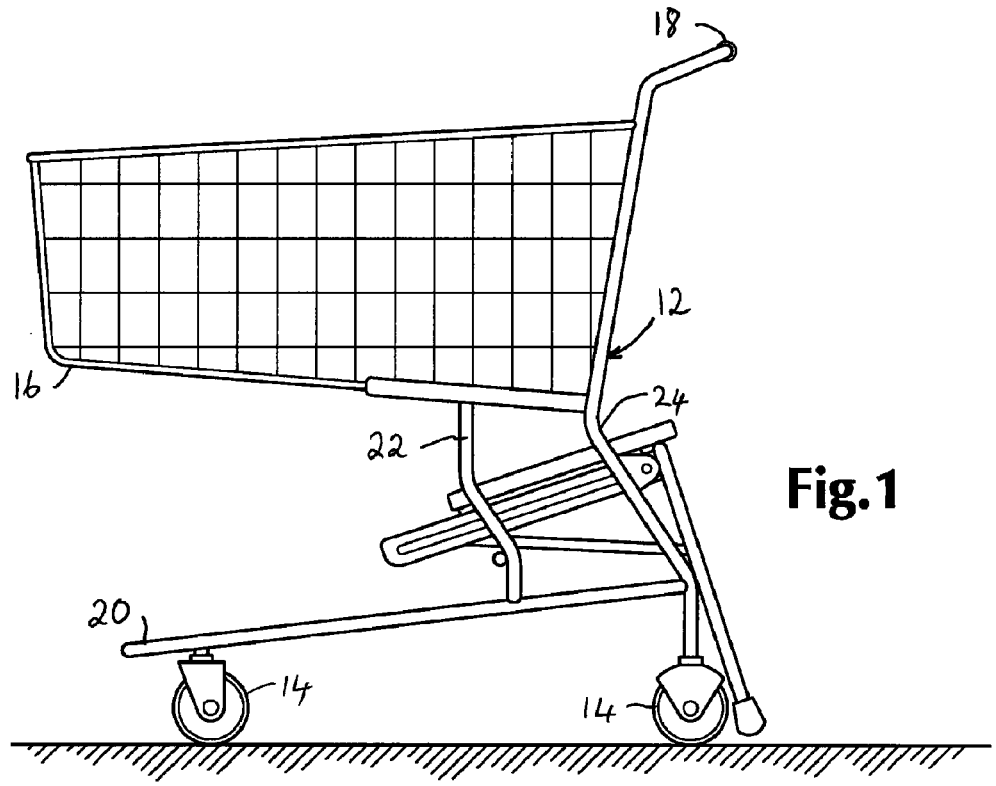
FIG. 1 is a side elevation of a shopping cart provided with an accessory seat, in stored position.
Figure 2:
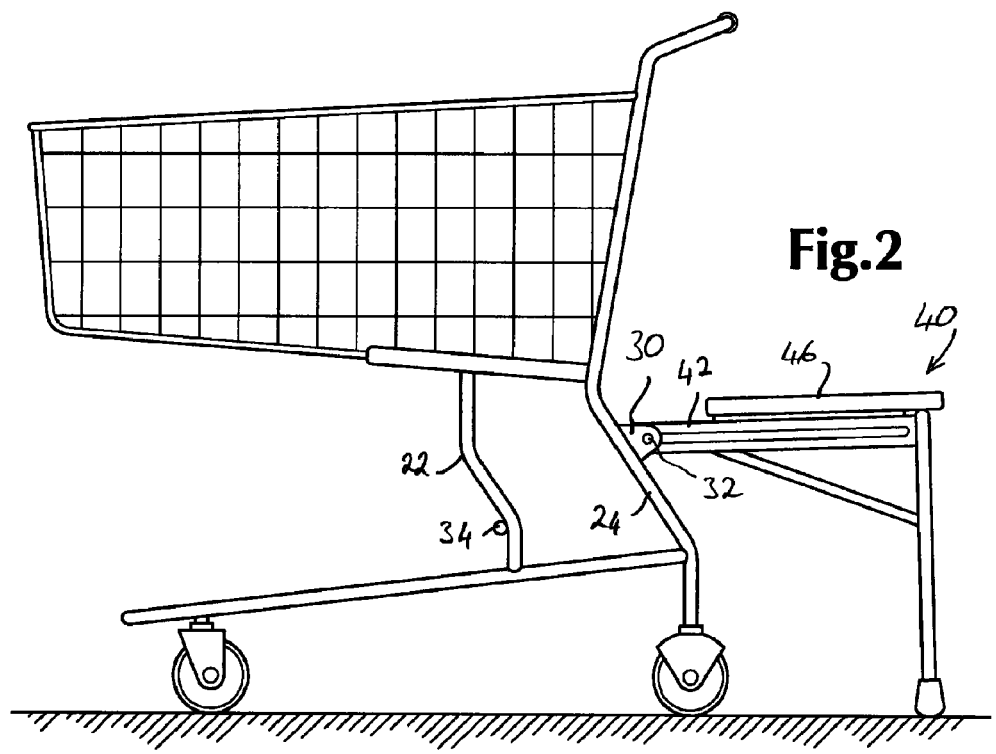
FIG. 2 is a side elevation of the shopping cart showing the seat in deployed position.

The shopping cart shown in FIGS. 1 and 2 comprises a chassis, four wheels 14 supporting the chassis (only two of the wheels can be seen in the views shown in FIGS. 1 and 2), and a basket 16 mounted on the chassis. The basket 16 is generally rectangular having a forward end and a rearward end. A handle 18 for pushing the cart is attached to the rear end of the basket. Generally, the chassis includes a lower frame 20 immediately above the wheels 14 and two pairs of columns 22, 24 that extend upward from the lower frame and support the basket above the lower frame. Thus, the basket is vertically spaced from the lower frame.

In the case of the illustrated cart, the two rear columns 24 form an inverted generally U-shaped structure and the handle 18 is provided by the base of the U, but this is not essential.

Two mounting brackets 30 extend rearward of the two rear columns 24 respectively. A first horizontal rod 32 is secured to and extends between the two mounting brackets 30. The brackets are positioned so that the horizontal rod 32 is somewhat below the basket 16 and above the lower frame 20. A second horizontal rod 34 is secured to the two forward columns 22 at a vertical level somewhat below the first horizontal rod.

The accessory seat comprises two elongate rails 42 each formed with a longitudinal slot 44 through which the horizontal rod 32 extends, The elongate rails may be L-shaped in profile for enhanced rigidity. A rectangular seat base 46 is attached to the rails 42 and holds the rails in parallel spaced relationship. The seat base 46 is positioned above the longitudinal rails and has two parallel longitudinal edges, disposed perpendicular to the horizontal rod 32, and two parallel transverse edges disposed perpendicular to the longitudinal edges. One of the transverse edges 48 is a forward edge of the seat base and the other transverse edge 50 is a rear edge of the seat base.

The base of an inverted U-shaped leg structure 54 is attached to the seat base in the vicinity of the rear edge 50, with the limbs 56 of the U-shaped leg structure extending downward as legs from the rear edge of the seat base substantially perpendicular to the seat base. The lower end of each limb is provided with a protective foot 58. Struts 60 attached to the longitudinal rails 42 and the corresponding limbs 56 of the leg structure maintain the leg structure and the rails in a substantially right angled relationship and thereby maintain rigidity of the accessory seat.

Figure 3:
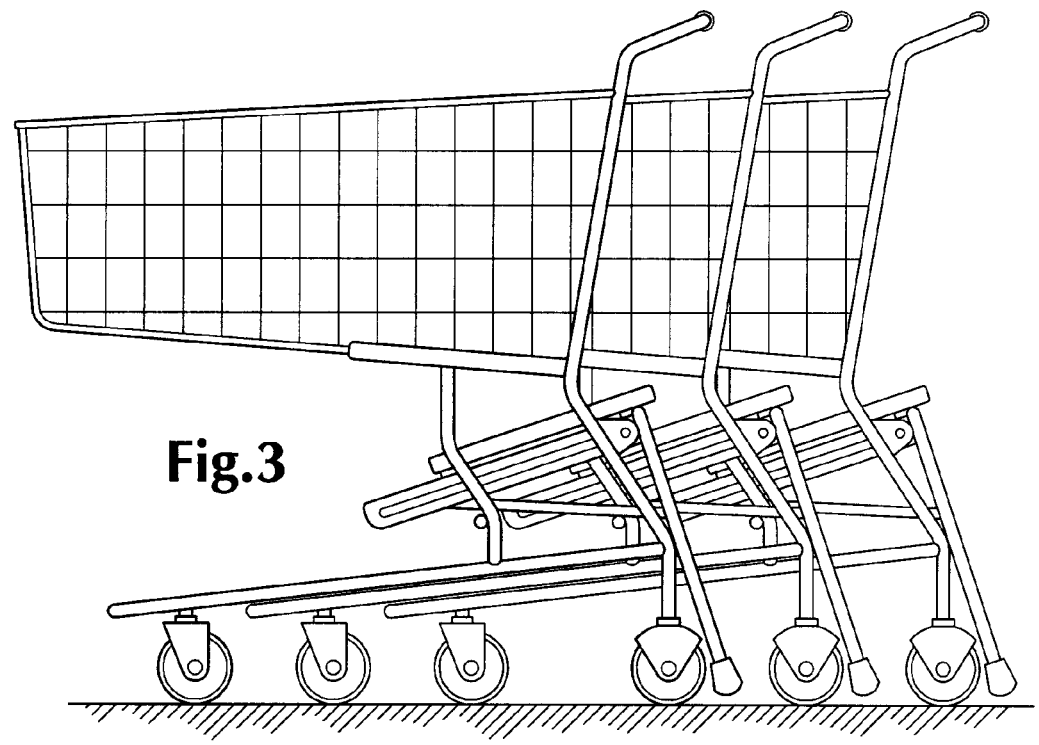
FIG. 3 is a side elevation showing multiple shopping carts as shown in FIG. 1, with the several shopping carts in nesting relationship.
Figure 4:
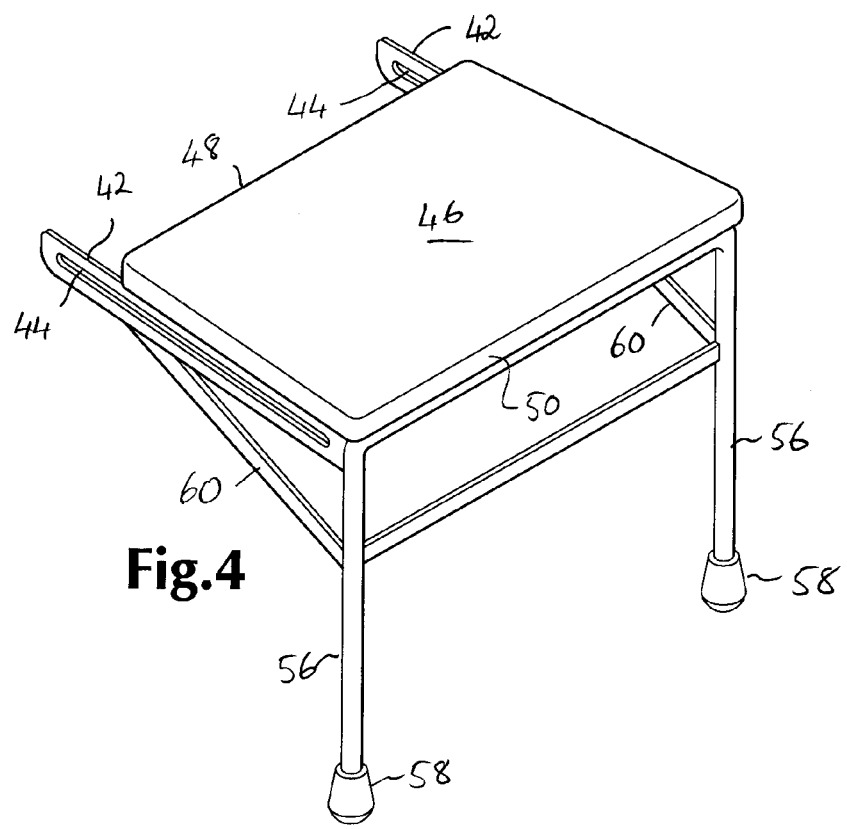
FIG. 4 is a perspective view of the accessory seat.

As shown in the drawings, the seat structure is movable relative to the shopping cart chassis between a deployed position (FIG. 2) and a stored position (FIG. 1). In the deployed position, the seat base is substantially horizontal and is supported by the horizontal rod 32 at the front end and by the legs 56, resting on the ground, at the aft end. The seat structure can be readily moved to the stored position by lifting the aft end of the seat structure and sliding the seat structure forward relative to the chassis, so that the rails move forward on the horizontal rod 32. As shown in FIG. 1, in the stored position the rod 32 is located at the aft end of the slots 44, the struts 60 rest on the horizontal rod 34, and the seat is inclined down in a forward direction. The legs 56 are close to the rear columns 24 of the chassis. Because the seat is inclined to horizontal, when two shopping carts are brought into nesting relationship the front end of the seat of one cart can be accommodated beneath the aft end of the seat of another cart, as shown in FIG. 3.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A shopping cart having a forward end and an aft end and comprising:
   a base structure including wheels, a chassis supported on the wheels, and a basket attached to the chassis, and
   an accessory seat structure attached in articulated fashion to the base structure and including a seat base and at least one leg attached to the seat base,
   and wherein the seat base has a forward end and an aft end, the accessory seat structure is movable relative to the base structure between a stored position, in which the forward end of the seat base is positioned beneath the basket, and a deployed position, in which the seat base extends aft of the basket and is supported in a substantially horizontal orientation by the base structure at the forward end of the seat base and by the at least one leg at the aft end of the seat base, and wherein the base structure includes a horizontal rod attached to the chassis beneath the basket and the accessory seat structure comprises a pair of elongate rails to which the seat base is attached and each of the pair of elongate rails is formed with a longitudinal slot through which the horizontal rod extends, whereby the accessory seat structure is attached to the base structure.

* * * * *